March 8, 1960  W. E. WERTS  2,927,425
FLOW CONTROL APPARATUS
Filed Nov. 7, 1956  4 Sheets-Sheet 1

INVENTOR.
WAYNE E. WERTS
BY Cecil J Arens
ATTORNEY

INVENTOR.
WAYNE E. WERTS
ATTORNEY

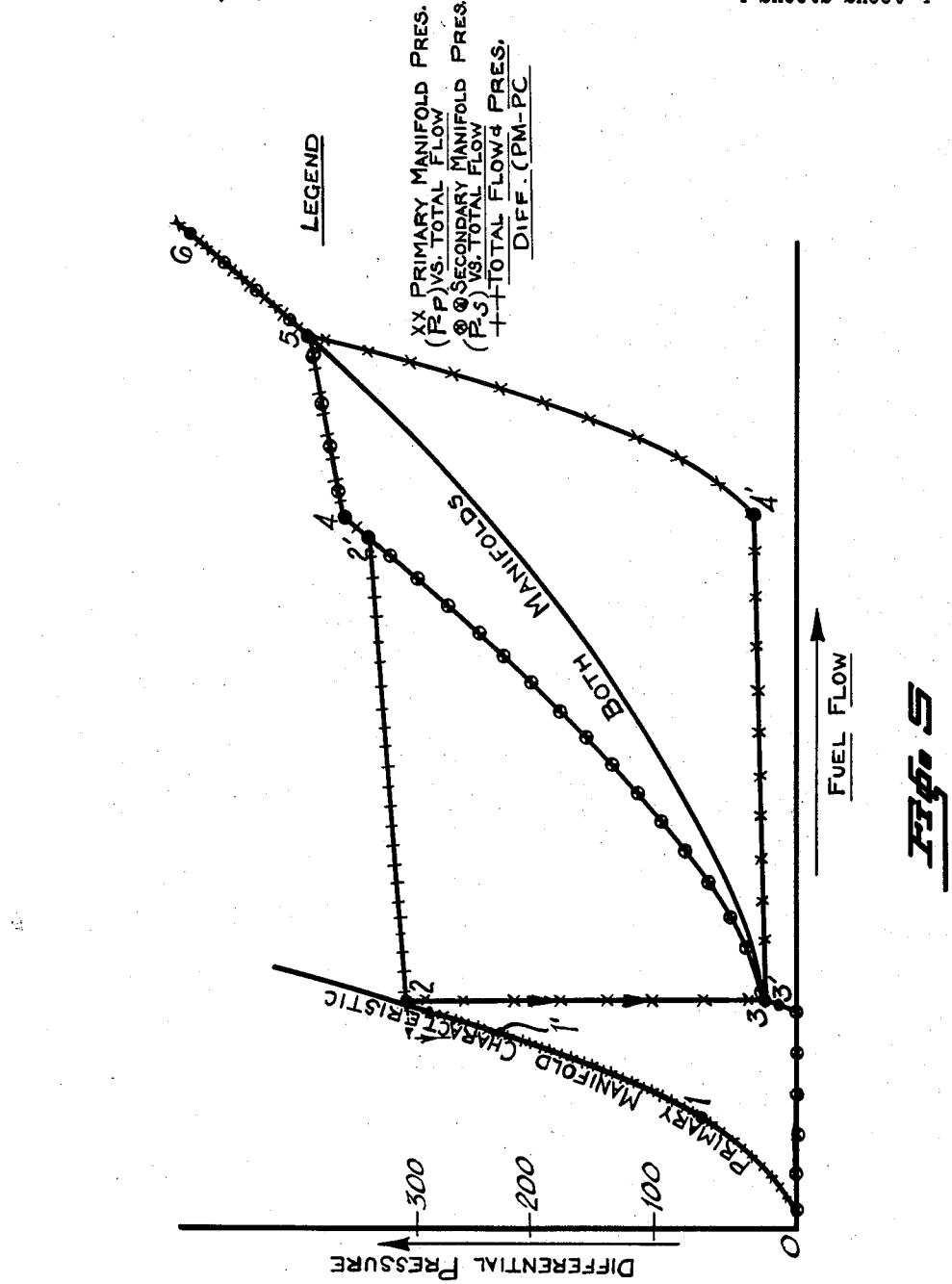

United States Patent Office 2,927,425
Patented Mar. 8, 1960

2,927,425

FLOW CONTROL APPARATUS

Wayne E. Werts, South Bend, Ind., assignor to Bendix Aviation Corporation, South Bend, Ind., a corporation of Delaware Application November 7, 1956, Serial No. 620,969

9 Claims. (Cl. 60—39.28)

This invention relates to fluid flow regulating means for gas turbine engines and more particularly to an automatic fuel flow regulator for maintaining a proper distribution of fuel to a plurality of combustion chambers.

The conventional gas turbine engine is arranged with a fuel distribution system having one or more fuel distributors or manifolds, each of which is adapted to receive pressurized fuel from a source and discharge the fuel through a plurality of discharge lines having separate fuel distributing jets or orifices attached thereto. Each fuel distributing jet or orifice is adapted to discharge into an associated combustion chamber, with the jets or orifices being arranged at different levels in a circular pattern around the engine. The hydraulic head existing at the various fuel distributing jets or orifices will vary according to the level of each individual jet orifice. When engine operation is such that a high fuel pressure is maintained in the fuel manifolds the difference in jet or orifice levels becomes unimportant. However, when engine operation is such that a low fuel manifold pressure is required, the jet or orifice level variations acquire a significant importance in that the upper level fuel distributing jets or orifices will not be sufficiently pressurized such that an even distribution of fuel to all of the combustion chambers will be maintained. As a result, fuel will be discharged from the upper level distributing jets or orifices into the combustion chambers in dribbles instead of the well defined spray pattern required for efficient engine operation. As a further result, the turbine will be subjected to extreme temperature differentials which cause inefficient engine operation as well as premature failure of the turbine assembly.

An object of this invention is to provide a fluid distributing system which automatically maintains a predetermined proportioning of fuel flow between a plurality of fuel manifolds.

Another object of this invention is to provide a fluid distributing system which distributes a total regulated fuel supply to a plurality of sets of fuel discharge distributing jets or orifices so as to maintain equal rates of fuel discharge between the jets or orifices in each set regardless of variations in relative elevation of the jets or orifices.

Another important object of this invention is to provide a device for distributing a total regulated fuel supply between dual fuel manifolds which operates in such a manner as to avoid instability in the system during a transition of fuel flow from one manifold to the other.

An important object of this invention is to provide means for distributing a total regulated fuel supply between a plurality of fuel manifolds so as to maintain a predetermined minimum fuel pressure in one or more of the manifolds depending upon the rate of total regulated fuel flow.

Still another object of this invention is to provide fluid flow controlling means for proportioning a total regulated fuel supply between dual fuel manifolds as a function of total regulated fuel flow.

The foregoing and other objects and advantages will become apparent in view of the following description taken in conjunction with the drawings, wherein:

Figures 4 and 5 show a series of curves having a $P_m - P_c$ vs. $W_f$ relationship.

Figure 1:
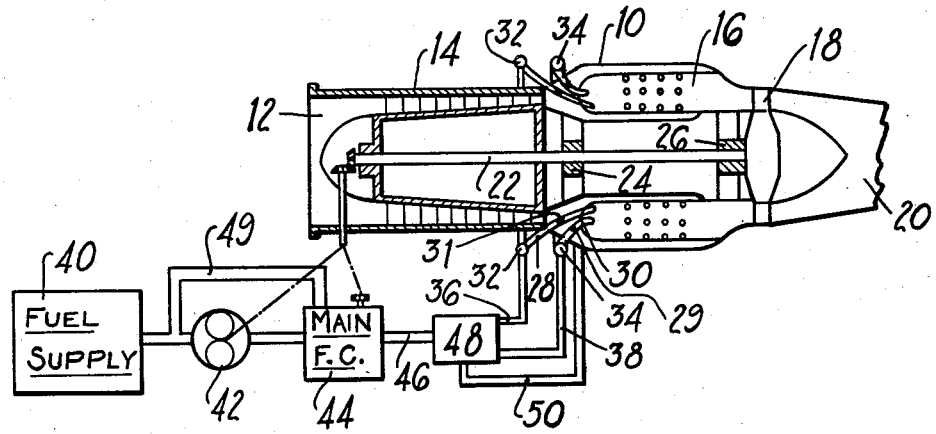
Figure 1 is a schematic view in elevation of an aircraft gas turbine engine equipped with fuel flow distribution apparatus constructed in accordance with the invention.

Referring to Figure 1 of the drawings, the present invention is shown in association with the combustion equipment of the usual aircraft gas turbine power plant. The gas turbine power plant comprises a cylindrical outer casing 10 having a forwardly disposed air intake opening 12 adapted to receive and conduct air to the axial flow compressor 14 which compresses and discharges the air to a plurality of combustion chambers 16 for supporting combustion of fuel supplied thereto as hereinafter explained. The heated gases or products of combustion are subsequently expanded through the turbine 18 and into the exhaust nozzle 20 from which the gases are discharged to the atmosphere to provide thrust. The turbine 18 is drivably connected to the compressor 14 through a shaft 22 journaled in bearings 24 and 26.

Fuel is supplied to the combustion chambers 16 through a double set of discharge tubes 28 and 30 mounted at the upstream end thereof. Dual fuel manifolds 32 and 34, designated as primary and secondary manifolds, respectively, supply fuel to the discharge tubes 28 and 30, respectively. A fuel distributing jet or orifice 29 of relatively small flow area is contained in each primary manifold discharge tube 28 and a similar jet or orifice 31 of relatively large flow area is contained in each secondary manifold discharge tube 30. The dual fuel manifolds 32 and 34 receive fuel through conduits 36 and 38, respectively, from a fuel control system which comprises a source of fuel supply 40 connected by way of an engine driven fuel pump 42 and main fuel control apparatus 44 to the inlet conduit 46 of a flow control device 48, which in turn discharges fuel to conduits 36 and 38. A by-pass fuel line 49 conducts fuel in excess of engine fuel requirements from the main fuel control 44 back to the pump 42 inlet. A conduit 50 connects a source of compressor discharge pressure $P_c$ with the fuel control device 48. The main fuel control apparatus 44 may be of any type arranged to meter a predetermined flow of fuel to the engine according to various engine operating conditions. Preferably, the main fuel control is of the type disclosed in Patent No. 2,689,606, issued September 21, 1954, in the name of F. C. Mock (common assignee).

Figure 2:
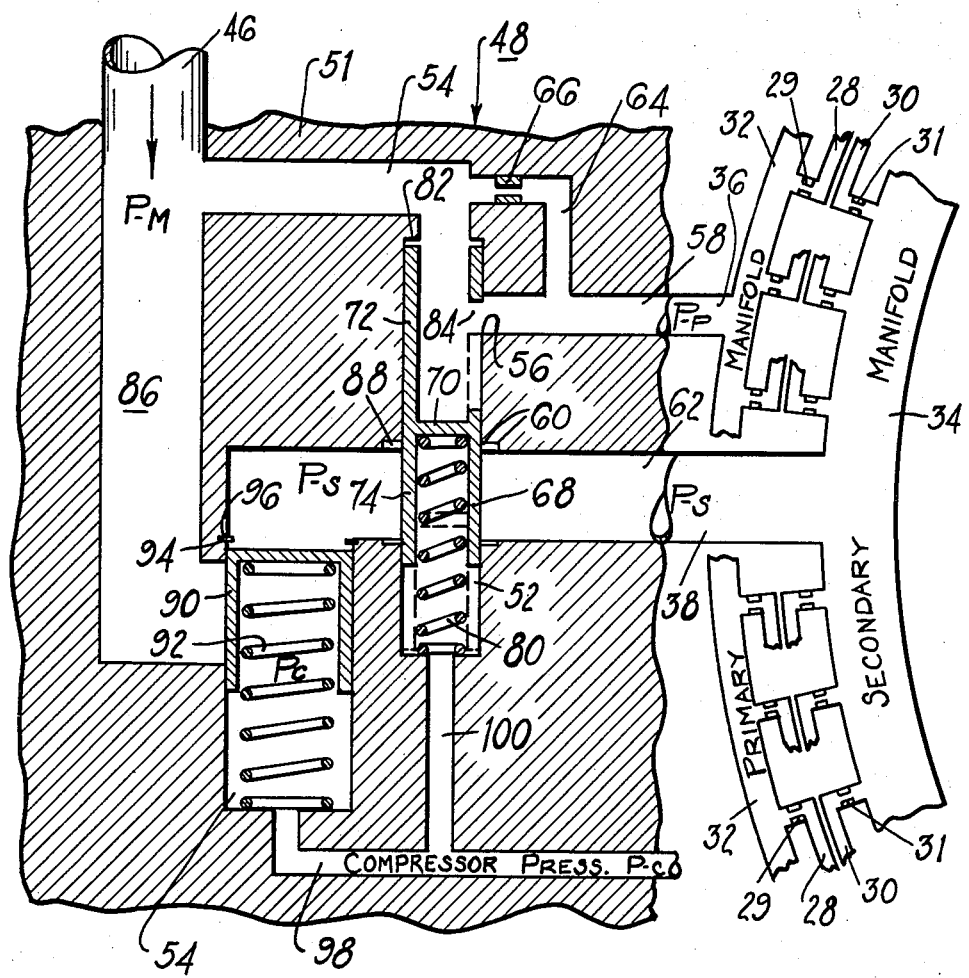
Figure 2 is a sectional view of the present invention shown removed from the engine and drawn in enlarged form.

*Figure 2*

As shown in Figure 2, the flow control device 48 comprises a casing 51 having a valve chamber 52 which communicates with fuel conduit 46 through a passage 54, with conduit 36 through discharge port 56 and passage 58 and with conduit 38 through discharge port 60 and passage 62. A branch passage 64 is connected between passages 54 and 58 in parallel flow relationship with discharge port 56 and contains a calibrated restriction 66 removably secured therein. A valve member 68 slidably disposed in valve chamber 52 is constructed with a wall 70 having oppositely disposed annular shaped end sections 72 and 74 open at their outermost ends. A spring 80 interposed between wall 70 and casing 51 acts to bias valve member 72 into contact with a shoulder 82 formed in casing 51. A port 84 formed in end section 72 is arranged to register with discharge port 56 or 60 depending upon the position of the valve member 68. A passage 86 connects fuel conduit 46 with an annular recess 88 arranged in parallel flow relationship with discharge port 60.

A cup shaped valve member 90 slidably contained by a bore 91 is arranged to control the flow of fuel through passage 86. The valve member 90 is biased to a closed position by a spring 92 interposed between the valve member 90 and casing 51, the spring urging the closed end of the valve member 90 into contact with a washer shaped stop member 94 contained by a recess 96 in casing 51. During engine operation, compressor discharge pressure $P_c$ is communicated through passage 50 (see Figure 1) to the spring side of valve member 90 by way of passage 98 and bore 91 and to the spring side of valve member 72 by way of passage 98, branch passage 100 and valve chamber 52.

Operation

Figure 4:
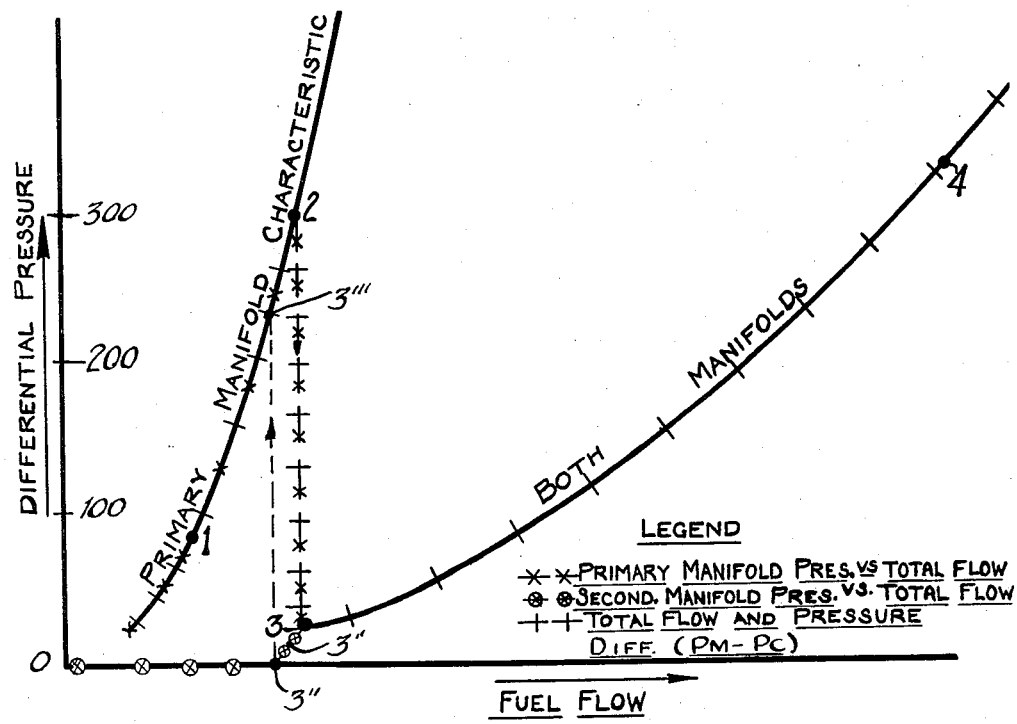

Assuming engine operation to be stable with a very low rate of metered flow being required, the movable components of the flow control device 48 will occupy the positions as shown in Figure 2. This condition is represented by point 1 on the curve which represents the primary manifold characteristics as shown in Figure 4. At this point, metered fuel flows to the primary manifold only via passage 64 and discharge port 56 to passage 58 and subsequently flows out of the primary manifold 32 through fuel distributing tubes 28 and distributing jets 29 to the combustion chambers 16.

To illustrate the operation of the device of the high range of metered fuel flow, it will now be assumed that the engine will be accelerated to maximum speed. In response to an operator request, the main fuel control 44 functions to increase the flow of metered fuel thereby effecting a subsequent rise in pressure $P_m$. The pressure $P_m$ acts to displace valve member 68 downward against the combined forces of the spring 80 and compressor discharge pressure $P_c$, thereby reducing the flow area of discharge port 56. Since compressor discharge pressure $P_c$ and combustion chamber 16 pressure are substantially the same, the $P_m - P_c$ pressure drop is a measure of the total pressure drop which exists between conduit 46 and the combustion chambers 16. Compressor discharge pressure $P_c$ thus provides a reference pressure over the operational range of the engine. As the flow area of discharge port 56 decreases, pressure $P_m$ rises accordingly such that valve member 68 continues to move downward in response to pressure $P_m$ in a regenerative manner. Referring to Figure 4 and the curve showing the primary manifold characteristics, as discharge port 56 closes the fuel flow rises along the curve from point 1 to point 2. At point 2, the flow of metered fuel has caused valve member 68 to disestablish communication between the flow of metered fuel and discharge port 56 and, subsequently, the lower edge of port 84 begins to register with discharge port 60. The opening point of discharge port 60 may be varied as desired by the calibration of spring 80. At this time, the primary manifold continues to receive fuel via passage 64, restriction 66, and passage 58 at a rate which maintains a predetermined minimum primary manifold pressure $P_p$. Upon an opening of discharge port 60 fuel flows at pressure $P_s$ to the secondary manifold 34 via annular recess 88 and passage 62 and to valve member 90 via annular recess 88 and passage 86. Point 3 on the curve indicates the lowest pressure and flow values allowable for pressurizing the primary and secondary manifolds such that a satisfactory fuel flow distribution will be available through both sets of manifold distributing jets 29 and 31 to the combustion chambers 16. As soon as the pressure differential across the secondary manifold distributing jets 31 reaches a predetermined value, which pressure differential is slightly below that of point 3, the $P_s - P_c$ pressure drop across valve member 90, being a measure of the pressure differential across the jets 31, acts to bias the valve downward against the spring 92 force thereby introducing an additional flow of fuel to the secondary manifold 34 via passage 86, annular recess 88 and passage 62. Point 3' of the curve indicates the opening point of valve member 90 which point may be varied to suit requirements by the calibration of spring 92.

The opening of valve member 90 causes a drop in the fuel pressure $P_m$ in passage 54 and chamber 52 which drop in pressure results in a displacement of valve member 68 to a stop position against shoulder 82. At this point, the primary manifold 32 again receives fuel via passage 64 and discharge port 56 and the secondary manifold 34 receives flow via the circuit which contains valve member 90. As the metered fuel flow increases, pressure $P_m$ rises accordingly until sufficient pressure exists again in chamber 52 to cause actuation of valve member 68. As the valve member 68 responds to pressure $P_m$, the aforementioned throttling of flow through discharge port 56 again occurs and the subsequent progressive increase in pressure $P_m$ causes valve member 68 to move downward reopening discharge port 60.

As the secondary manifold 34 fuel flow increases, the $P_s - P_c$ pressure drop increases and causes a corresponding downward actuation of valve member 90 against spring 92 which in turn results in an increase in the effective flow area of passage 86 such that the total flow of fuel received by the combustion chambers from both manifolds progresses along the designated curve from point 3 to point 4. As point 4 is approached, the $P_m - P_c$ pressure differential continues to increase across valve member 68 due to increasing flow conditions and at point 4, the $P_m - P_c$ pressure differential has caused the valve member to be displaced downward to the position shown by the dotted outline of the valve member. At point 4, a condition of maximum fuel flow is reached and the flow of fuel to the primary and secondary manifolds is substantially unrestricted with the pressure drop in the system occurring at the primary and secondary fuel manifold distributing jets 29 and 31, respectively. At this point, engine operation is stabilized at a maximum speed.

To return to point 1 under decreasing fuel flow conditions, the above mentioned sequence of events will occur in a reverse sense. As the metered fuel flow from the main fuel control decreases, a drop in the $P_m - P_c$ pressure drop across valve member 68 will occur. Valve member 68 will be displaced upward by spring 80, thus closing off discharge port 60. A decrease in the $P_s - P_c$ pressure differential across valve member 90 due to the decrease in fuel flow through discharge port 60 will result but due to the fuel flow past valve member 90 the $P_s - P_c$ pressure differential across valve member 90 does not decrease to zero until a total fuel flow lower than that which caused said valve member 90 to open is reached. At point 3'' on the curve of Figure 4 valve member 90 will snap shut under the influence of spring 92. The secondary manifold will then be isolated from the metered fuel flow and the shift back to the primary manifold only will occur along the line from point 3'' which represents a zero $P_s - P_c$ differential pressure to point 3''' on the primary manifold curve. The point at which the shift from 3'' to 3''' occurs may be varied as desired by means of spring 92 the load of which determines the secondary manifold pressure at which valve member 90 closes.

Figure 3

Figure 3:
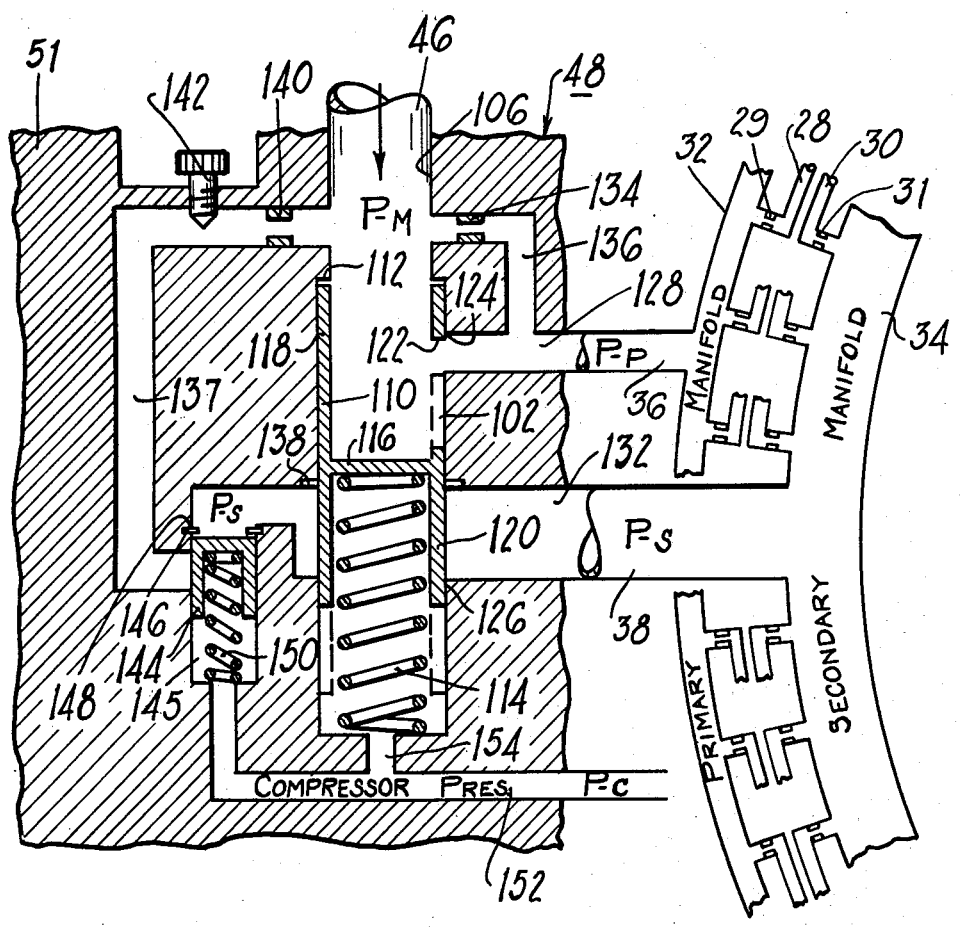
Figure 3 is an enlarged sectional view of a modification of the present invention shown removed from the engine.

Referring now to the embodiment shown in Figure 3, the casing 50 contains a valve chamber 102 which communicates with fuel inlet conduit 46 through main passage 106 and slidably receives a cylindrical valve member 110 which is biased against a shoulder 112 in casing 51 by a spring 114 interposed between a wall portion 116 of valve member 110 and casing 50. The valve member 110 is constructed with the wall 116 having oppositely disposed annular shaped end sections 118 and 120 extending outwardly therefrom and being open at their outermost ends. An opening or port 122 formed in end section 118 is arranged to register with discharge port 124 or 126, depending upon the position of valve member 110. The discharge port 124 is connected to conduit 36 (see Figure 1) via a passage 128 and the discharge port 126 is connected to conduit 38 (see Figure 1) via annular recess 130 and passage 132. A restriction 134 is contained by a branch passage 136 which connects fuel inlet conduit 46 with passage 128 in parallel flow relationship with discharge port 124.

A passage 137 connects fuel conduit 46 with an annular recess 138 arranged in parallel flow relationship with discharge port 126. The passage 137 is provided with a restriction 140 removably secured therein and an adjustable restriction 142 threadedly engaged with casing 51. A cup shaped member 144 slidably contained by a valve chamber 145 is arranged to control the flow of fuel through passage 137. The cup shaped valve member 144 is biased to a closed position against a ring 146 contained in a recess 148 in casing 51 by a spring 150 interposed between the valve member and casing 51.

In the position shown, the valve member 144 prevents communication between branch passage 108 and passage 138. A conduit 152 vents compressor discharge pressure $P_c$ to the spring side of valve member 144 and a passage 154 connected between conduit 152 and valve chamber 102 vents compressor discharge pressure $P_c$ to the spring side of valve member 110.

*Operation*

Assuming engine operation to be stable with a very low rate of metered fuel flow being required, the movable components of the flow control device 48 will occupy the positions as shown in Figure 3. This condition is represented by point 1 on the curve of Figure 5 which represents the primary manifold characteristics. At this point metered fuel flow flows to the combustion chambers through the primary manifold 32 only via fuel inlet conduit 46, valve chamber 102, discharge port 124, passage 128, and passage 36, as well as by way of branch passage 136, passage 128 and passage 36, the total flow of fuel subsequently flowing through primary manifold 32, fuel distributing tubes 28 and distributing jets or orifices 29.

To illustrate the operation of the flow control device 48, it will now be assumed that the engine is to be operated at maximum fuel flow conditions. In response to the operator initiated request, the flow of metered fuel from the main fuel control 44 to valve chamber 102 will increase and a subsequent rise in pressure $P_m$ will occur. At a predetermined flow of fuel, the pressure differential $P_m-P_c$ across valve member 110 will overcome the spring 114 force and valve member 110 will be displaced downwardly to initiate throttling of discharge port 124. As the flow area of discharge port 124 decreases, the fuel pressure $P_m$ increases and imposes a greater downward acting force against valve member 110 which causes a further throttling of fuel flow through discharge port 124. The regenerative action thus imposed against valve member 110 causes the valve member to snap downward closing off discharge port 124 and allowing port 122 to register with discharge port 126. The calibration of spring 114 will determine the opening point of discharge port 126 and may be varied as desired to suit requirements of a particular system. The snap action of valve member 110 minimizes any tendency for slow initiation of fuel flow to manifold 34 which would effect an insufficient pressurization of the manifold 34 such that dribbling or poor distributing would occur at orifices 31. Point 2 on the curve of Figure 5 indicates the point at which valve member 110 closes discharge port 124 and opens discharge port 126. It will be noted that the curve shows a drop in the primary manifold pressure $P_s$ from point 2 to point 3, point 3 indicating the lowest relative pressure allowable for pressurizing the primary and secondary manifolds, 32 and 34, such that a satisfactory fuel flow distribution will be available through both sets of manifold distributing jets on orifices, 29 and 31, to the combustion chambers 16. Below these values, the aforementioned dribble condition would result. At point 3, the primary manifold 32 receives sufficient fuel by way of passage 136 and restriction 134 to maintain the aforementioned minimum fuel flow and pressure values. When discharge port 126 opens to admit fuel through passages 132 and 38 to the secondary manifold 34 and to valve member 144 via passage 137, the pressure $P_s$ rises and at point 3', which point is slightly below the aforementioned minimum pressure point 3, the pressure differential $P_s-P_c$ across valve member 144 is sufficient to overcome the spring 150 force to cause downward movement of valve member 144. As valve member 144 moves downwardly, communication is established between passage 108 and passage 138 thereby introducing a flow of fuel in parallel with that through discharge port 126 to the secondary manifold 34.

The calibration of restrictions 140 and 142 is such that the fuel flow through the parallel circuit is equivalent to that which existed through discharge port 126 when valve member 144 opened. To this end, the restriction 140 is selected to provide the same flow and pressure into the secondary manifold after valve member 144 opens as that which existed through discharge port 126 when the secondary manifold was pressurized and valve member 144 opened, which flow and pressure corresponds to point 3 on the curve of Figure 5. The externally adjustable restriction 142 acts as a vernier adjustment and may be set to compensate for manufacturing tolerances, etc. of the restriction 140 such that a precise calibration of the fuel flow through passage 137 may be made as desired. The flow thus directed through the parallel circuit causes a drop in pressure $P_m$ in chamber 102 such that valve member 110 will be displaced upward sufficient to close off discharge port 126 without causing a reopening of discharge port 124. The pressure $P_m$ is thus maintained at the pressure level of point 2. As metered fuel pressure $P_m$ continues to increase, the $P_m-P_c$ pressure differential increases such that valve member 110 again moves downward causing a reopening of discharge port 126. Since discharge port 126 will afford relatively large increases in flow area as valve member 110 responds to an increase in pressure $P_m$, the total fuel flow through the system will increase significantly with slight increases in pressure $P_m$. This is shown by the total flow and pressure curve of Figure 5 from point 2 to point 2'. When the secondary manifold pressure $P_s$ reaches a value sufficiently high enough that no further throttling of fuel flow through discharge port 126 takes place, further increases in pressure $P_m$ will cause the valve member 110 to be biased downward with the top edge of the valve member progressively reopening discharge port 124. Point 4 to point 5 on the curve of Figure 5 indicates reopening of discharge port 124 and the corresponding increase in metered fuel flow. Point 4' to point 5 shows the increasing pressure characteristic as fuel flow to the primary manifold 32 increases. At maximum fuel flow conditions, which position is indicated by point 6 on the curve of Figure 5, the valve member 110 will occupy the position shown in dotted outline and all passages to the primary and secondary manifolds are open to fuel flow. Since the largest portion of the fuel flow to the manifolds is by way of discharge ports 124 and 126, which are relatively unrestricted, the pressure drop in the system will result from the primary and secondary fuel distributing jets 29 and 31, respectively.

Under decreasing flow conditions, the return to point 1 on the curve of Figure 5 will be effected by the same sequence of valve operation as in the case of increasing flow down to the point at which discharge port 126 closes.

The closing of discharge port 126 and the subsequent reopening of discharge port 124 is again accomplished by a snap action of valve member 110. In order to prevent flutter of valve member 110 at this point, the transition back to the primary manifold is made at a slightly lower fuel flow than that which caused valve member 110 to open discharge port 126.

As metered fuel flow and pressure $P_m$ decrease, valve member 110 acts to close off discharge port 126 and, at point 2, both discharge ports, 124 and 126, are closed. The valve member 144 remains open at this time under pressure $P_s$ which is supplied by way of the parallel circuit to secondary manifold 34. As fuel pressure $P_m$ continues to decrease, valve member 110 snaps upward to open discharge port 124. The resulting sudden drop in chamber 102 pressure $P_m$ causes a decrease in flow through valve member 144 whereupon the secondary manifold pressure $P_s$ decreases and valve member 144 closes under the influence of spring 150. Point 1' on the curve of Figure 5 illustrates the slightly lower fuel flow condition at which the transition back to primary manifold 32 operation only is effected by the snap action of valve member 110 as influenced by the fuel flow through valve member 144 to the secondary manifold 34. The secondary manifold is completely isolated from metered fuel flow at point 1'. The transition to the primary manifold characteristic curve is indicated by the dotted line from point 2 to point 1', the latter point being slightly below and to the left of point 2. From this latter point, the fuel flow and pressure valves decrease along the primary manifold characteristic curve to point 1, at which point engine operation is stabilized.

Although only two embodiments of the invention have been illustrated and described, it will be apparent to persons skilled in the art that various changes in form and relative arrangement of parts may be made to suit requirements.

I claim:

1. In control apparatus for an internal combustion engine, a fuel system having a primary fuel manifold and a secondary fuel manifold, fuel control means for controlling the supply of fuel to said primary and secondary fuel manifolds, said control means including a conduit connectible to a soure of fuel and to said primary and secondary fuel manifolds, a passage connected between said source of fuel and said secondary fuel manifold in parallel flow relationship with said conduit, and means responsive to pressurization of said secondary manifold for controlling fuel flow through said passage to augment the fuel flow from said conduit to said secondary manifold, said control means being responsive to the pressure of the fuel in said conduit to establish communication between said conduit and said secondary fuel manifold when the flow of fuel in the conduit is sufficient to maintain minimum predetermined fuel pressures in each of said primary and secondary fuel manifolds and to disestablish communication between said conduit and said secondary manifold when said flow of fuel is sufficient only to maintain the minimum predetermined fuel pressure in said primary manifold.

2. In fuel control apparatus for an internal combustion engine having a combustion chamber, said fuel control apparatus including a primary fuel manifold and a secondary fuel manifold for delivering fuel to said combustion chamber, a conduit connected between a source of fuel and said primary and secondary fuel manifolds, fuel control means in said conduit for controlling the flow of fuel to said primary and secondary fuel manifolds in accordance with the pressure of the fuel in said conduit, valve means in the conduit in parallel flow relationship with said control means for controlling the flow of fuel to said secondary fuel manifold, said valve means being responsive to the fuel pressure in said secondary manifold and to a fluid pressure in said combustion chamber, said control means being responsive to a predetermined fuel pressure in said conduit to establish communication between said conduit and said secondary fuel manifold whereupon said valve means is caused to open in response to a predetermined pressure differential between said secondary manifold fuel pressure and said combustion chamber pressure and provide an additional flow of fuel to said secondary fuel manifold, said control means acting to disestablish communication between said conduit and said secondary fuel manifold when the fuel pressure in said conduit falls below said predetermined value, said valve means being held in the open position in response to the pressure differential between said fuel pressure in said secondary manifold and said combustion chamber pressure and then closing when said pressure differential falls below a predetermined value.

3. In a fuel system for a gas turbine engine having an air compressor and a combustion chamber arranged to receive air under pressure from said air compressor, the combination of a primary fuel manifold, a secondary fuel manifold, a plurality of primary fuel nozzles operably connected to said primary fuel manifold, a plurality of secondary fuel nozzles operably connected to said secondary fuel manifold, said plurality of primary and secondary fuel nozzles being arranged to discharge fuel into said combustion chamber, a first calibrated restriction in each of said primary nozzles, a second calibrated restriction in each of said secondary fuel nozzles, said first calibrated restriction having a lower flow rate than said second calibrated restriction, a source of metered fuel, fuel control means having an inlet connected to said source of metered fuel and first and second outlet ports connected to said primary fuel manifold and said secondary fuel manifold respectively, said control means including valve means for varying the rate of fuel flow through said first outlet port and for selectively opening and closing said second outlet port in accordance with the total pressure drop across said first and second calibrated restrictions and an always open passage in parallel flow relationship with said first outlet port for maintaining a predetermined minimum flow of fuel to said primary manifold irrespective of the position of said valve means.

4. In fuel control apparatus for an internal combustion engine having a combustion chamber and being operable with a source of fuel, said fuel control apparatus including a primary fuel manifold, a secondary fuel manifold, said primary and secondary fuel manifold being connected to deliver fuel to said combustion chamber, a conduit connected between said source of fuel and said primary and secondary fuel manifolds, a first passage in said conduit for directing fuel to said primary fuel manifold, a second passage in said conduit for directing fuel to said secondary fuel manifold, first valve means for varying the effective flow area of said first and second passages, an always open third passage in parallel flow relationship with said first valve means and in series with said first passage, a fourth passage in parallel flow relationship with said first valve means and in series with said second passage, second valve means responsive to the fuel pressure in said secondary fuel manifold and to a fluid pressure in said combustion chamber for controlling the fuel flow through said fourth passage, said first valve means being operative to open said second passage in response to a predetermined fuel pressure in said conduit to initiate a flow of fuel to said secondary fuel manifold and, at the same time, operating to close said first passage, said second valve means being operative to open in response to a predetermined pressure difference between said combustion chamber and said secondary fuel manifold to allow fuel to flow through said fourth passage to augment the initial flow of fuel supplied to the manifold, said second valve means remaining open until the fuel pressure in said conduit drops below said predetermined value, said third passage being operative to maintain a minimum predetermined flow of fuel to said primary fuel manifold when said first passage is closed.

5. In fuel control apparatus for a gas turbine engine operable with a source of metered fuel and having an air compressor and a combustion chamber, said combustion chamber being arranged to receive pressurized air delivered by said air compressor, said fuel control apparatus including a primary fuel manifold, a secondary fuel manifold, a plurality of first fuel nozzles connected to said primary fuel manifold, a plurality of second fuel nozzles connected to said secondary fuel manifold, said first and second fuel nozzles being arranged to discharge fuel into said combustion chamber, a chamber, a conduit connected between said source of metered fuel and an inlet to said chamber, first and second discharge ports in said chamber, a first passage connected between said first discharge port and said primary fuel manifold, a second passage connected between said second discharge port and said secondary fuel manifold, first valve means slidably disposed in said chamber for controlling the effective flow area of said first and second discharge ports, said first valve means having oppositely disposed sides, one of the sides being exposed to the fuel pressure in said inlet and the other of the sides being exposed to compressor discharge pressure, an always open third passage connected between said conduit and said first passage in parallel flow relationship with said first discharge port, a calibrated restriction in said third passage, a fourth passage connected between said conduit and said second passage in parallel flow relationship with said second discharge port, second valve means operable in response to the fuel pressure in said secondary fuel manifold and to compressor discharge presssure for starting and stopping a flow of fuel through said fourth passage; fuel flow controlling means in said fourth passage upstream from said second valve means, said first valve means being operable as a function of the differential between inlet fuel pressure and compressor discharge pressure to proportion the total inlet fuel supply between said first and second discharge ports in accordance with minimum predetermined primary and secondary fuel manifolds operating fuel pressures, said second valve means being operative to open in response to a predetermined pressure differential between said compressor discharge and said secondary manifold to increase the flow of fuel to said secondary manifold, said second valve means being operative to remain open until said secondary fuel manifold pressure drops below a predetermined value subsequent to a closing of said second discharge port and closing thereafter.

6. Fuel control apparatus for an internal combustion engine comprising a primary fuel manifold, a secondary fuel manifold, a source of metered fuel, control means for controlling the flow of metered fuel to said primary and secondary fuel manifolds, said control means having a chamber, a conduit connected between an inlet to said chamber and said source of metered fuel, pressure responsive valve means slidably contained in said chamber, said valve means being responsive to the inlet fuel pressure, first and second outlet ports in said chamber, said first and second outlet ports having fluid connections with said primary fuel manifold and said secondary fuel manifold respectively, resilient means acting on said pressure responsive valve means in opposition to the inlet fuel pressure to urge the valve means toward a position such that communication is established between said inlet and said first outlet port and disestablished between said inlet and said second outlet port, a first passage connected between said conduit and said second outlet port in parallel flow relationship with said pressure responsive valve means, valve means in said passage for controlling the fuel flow therethrough, a second passage connected between said conduit and said primary fuel manifold fluid connection in parallel flow relationship with said first outlet port, said pressure responsive valve means being arranged to respond to a predetermined inlet fuel pressure to close said first outlet port and open said second outlet port whereupon said valve means responds to the pressure in said secondary fuel manifold and opens to further pressurize said secondary fuel manifold.

7. In fuel control apparatus for an internal combustion engine, a fuel system having a primary fuel manifold and a secondary fuel manifold, fuel control means for controlling the supply of fuel to said primary and secondary fuel manifolds, said control means including a conduit connected to a source of fuel, said control means being responsive to the fuel pressure in said conduit to establish communication between said conduit and said secondary manifold when the flow of fuel in the conduit is above a first predetermined value and to disestablish communication between said conduit and said secondary fuel manifold when said flow of fuel is below a second predetermined value, and means for stabilizing said control means when said flow of fuel is between said first and second predetermined values, said last named means including a passage connected between said source of fuel and said secondary fuel manifold in parallel flow relationship with said conduit, valve means responsive to pressurization of said secondary fuel manifold for controlling fuel flow through said passage, said valve means being actuated to an open position in response to pressurization of said secondary fuel manifold and remaining open until said fuel flow reaches said second predetermined valve whereupon said valve means is actuated to a closed position.

8. In a fuel control apparatus as claimed in claim 5 wherein said fuel flow controlling means includes a restriction for limiting the fuel flow through said fourth passage to prevent the fuel pressure in said conduit from dropping below a predetermined minimum value when said second valve means is open.

9. In fuel control apparatus as claimed in claim 6 wherein said first passage is provided with fuel flow control means for controlling the pressure drop through said first passage when said valve means is open.

References Cited in the file of this patent

UNITED STATES PATENTS

| | | |
|---|---|---|
| 2,617,478 | Hildestad | Nov. 11, 1952 |
| 2,724,239 | Fox | Nov. 22, 1955 |
| 2,770,945 | Crim | Nov. 20, 1956 |

FOREIGN PATENTS

| | | |
|---|---|---|
| 1,075,220 | France | Apr. 14, 1954 |
| 744,013 | Great Britain | Jan. 25, 1956 |